(12) United States Patent  
Abbruscato

(10) Patent No.: US 7,790,992 B1
(45) Date of Patent: Sep. 7, 2010

(54) ELECTRONIC SCALE WITH TWO DIFFERENT TYPES OF POWER ON SWITCHES

(76) Inventor: Charles Richard Abbruscato, 12700 Diamond Dr., Burnsville, MN (US) 55337

( * ) Notice: Subject to any disclaimer, the term of this patent is extended or adjusted under 35 U.S.C. 154(b) by 242 days.

(21) Appl. No.: 12/229,715

(22) Filed: Aug. 26, 2008

(51) Int. Cl.
G01G 21/00 (2006.01)
(52) U.S. Cl. ...................................... 177/244
(58) Field of Classification Search ............... 177/238, 177/244
See application file for complete search history.

(56) References Cited

U.S. PATENT DOCUMENTS

| 4,181,946 | A | | 1/1980 | Loshbough et al. |
| 4,204,197 | A | | 5/1980 | Loshbough et al. |
| 4,236,222 | A | | 11/1980 | Loshbough et al. |
| 4,238,784 | A | | 12/1980 | Keen et al. |
| 4,258,812 | A | * | 3/1981 | Pfeiffer ................. 177/210 R |
| 4,326,596 | A | * | 4/1982 | Beck ........................ 177/178 |
| 4,712,627 | A | | 12/1987 | Harrington et al. |
| 4,751,661 | A | | 6/1988 | Amacher et al. |
| 4,763,739 | A | | 8/1988 | Kasinoff |
| 4,909,338 | A | | 3/1990 | Vitunic et al. |
| 4,934,469 | A | * | 6/1990 | Jackson ...................... 177/244 |
| 5,000,275 | A | | 3/1991 | Bullivant |
| 5,610,373 | A | | 3/1997 | Graves et al. |
| 5,640,334 | A | | 6/1997 | Freeman et al. |
| 5,750,937 | A | | 5/1998 | Johnson et al. |
| 6,038,465 | A | | 3/2000 | Melton, Jr. |
| 6,166,335 | A | * | 12/2000 | Soehnle ....................... 177/177 |
| 6,838,624 | B2 | * | 1/2005 | Chan ........................... 177/50 |
| 6,963,036 | B1 | | 11/2005 | Zicher |
| 7,009,119 | B2 | | 3/2006 | Carlucci et al. |
| 7,186,930 | B1 | | 3/2007 | Wong et al. |
| 2010/0012393 | A1 | * | 1/2010 | Tanida et al. ................... 177/1 |

* cited by examiner

Primary Examiner—Randy W Gibson
(74) Attorney, Agent, or Firm—Miller Patent Services; Jerry A. Miller

(57) ABSTRACT

A weight scale consistent with certain implementations has a case having a weight supporting surface that supports an object being weighed. An array of load cells is provided upon which the weight supporting surface rests. A weight measuring circuit receives output signals from the array of load cells and calculates a weight responsive thereto. A first switch trips when a weight is applied to the weight supporting surface while the weight scale is situated on a soft surface. A second switch trips when a weight is applied to the weight supporting surface while the weight scale is situated on a hard surface. A power source is provided and a turn-on circuit responsive to the first and second switch applies power from the power source to the weight measuring circuit upon detection that either the first or second switch has tripped as a result of a weight being applied to the weight supporting surface. This abstract is not to be considered limiting, since certain embodiments may deviate from the features described in this abstract.

26 Claims, 4 Drawing Sheets

US 7,790,992 B1

ELECTRONIC SCALE WITH TWO DIFFERENT TYPES OF POWER ON SWITCHES

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

One of the significant challenges for battery powered personal weight scales is the conservation of battery power. To conserve the battery, such scales are designed so that the minimum amount of power is consumed while the scale is idle and not in use. There are several methods currently in use to accomplish that, but none of the known methods provide totally satisfactory results.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
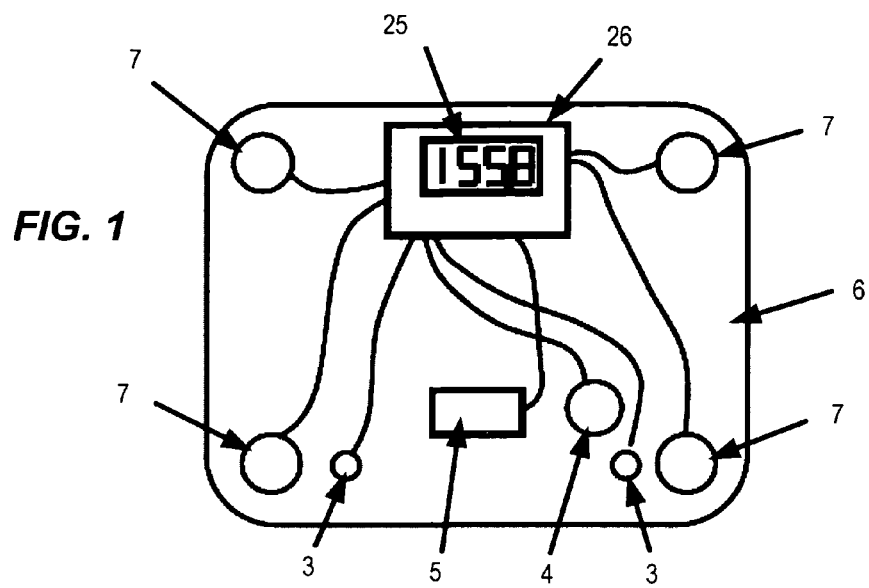
FIG. 1 is a schematic diagram of the top view of the inside of an example implementation weight scale consistent with certain embodiments of the invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, a hard surface is defined as a surface such as a hard surface floor made of wood, tile, linoleum, cement, pressboard, or a composite material that does not have a substantial amount of vertical flex in the surface material when a weight is applied thereto. A soft surface is defined as a surface such as a carpeted floor with padding underneath that permits a localized cushioning when a vertical load is applied thereto. That is, for example, when a foot of less than a couple of inches is used to carry a weight on a soft surface, the foot will sink locally into the surface to absorb some of the weight; whereas no significant movement in the surface would occur to a hard surface when that same foot carries the same weight. Generally, the distinction is applicable to the difference in the behavior of a hard floor versus a carpeted floor.

As previously noted, one of the significant challenges for battery powered personal weight scales is the conservation of battery power. To conserve the battery, such scales are designed so that the minimum amount of power is consumed while the scale is idle and not in use. There are several methods currently in use to accomplish that, but none of the known methods provide totally satisfactory results.

One approach to minimizing battery consumption during times of inactivity is to a bias voltage to the load cells keeping them active. When a weight is applied, a low power sensor can detect the signal from the load cell and turn the scale On. However, the greater the capacity of the load cells, the more power is consumed. As a result, this method consumes an unsatisfactory amount of power and has a shorter battery life than other methods.

A simple method that could be used for conserving power is to turn the scale Off until it is ready for use. While this is not too inconvenient for a table top scale, is can be awkward for a personal scale placed on the floor. To avoid having the user lean over to hit a switch to turn the scale On, some designs have a turn-On switch that can be enabled with a kick by the foot. While kicking a switch or bending over to turn it on may be easy for some people, it is not so convenient for the frail, obese or elderly.

Another simple method is to use a vibration sensor to turn the scale On. Instead of kicking a switch, the user kicks the scale to trip the vibration sensor. While the turn-On mechanism is different from a kick switch as described above, it suffers from the same disadvantages as having to kick a switch.

Another method is to use a pressure sensitive switch embedded into the structure of the scale so that simply stepping on the scale trips the switch and turns the scale On. This method has the advantage of the simplest operation for the user, but suffers from a significant disadvantage. The pressure switch requires some small movement in order to trip and a certain minimum amount of weight is needed to force the contacts of the switch together. While high sensitivity is useful, the switch must be robust enough to handle the maximum weight capacity of the scale, thus putting a limit as to how sensitive the switch can be. This creates variability in how much weight is needed to trip the pressure sensitive switch that is unfortunately dependent on the floor surface. While a small or modest amount of weight may be needed with the scale on a hard surface, a much larger weight could be required if the scale is on a soft padded surface. On a plush carpet with thick padding, the scale might not turn On at all. Conversely, if the pressure sensitive switch for a high capacity scale was designed to operate on soft carpeting, it would lack the robustness and reliability needed for operation on a hard surface. The inherent conflict between the two floor surface types forces complexity and the risk of lower reliability on a compromise implementation.

In accord with certain embodiments consistent with the present invention, a new method and apparatus is described herein that in certain implementations exhibits improved idle power consumption, simplest operation for the user and works well on hard and soft surfaces. Further, this method and apparatus is straight forward to implement with high repeatability on high capacity scales.

In implementations consistent with certain embodiments, pressure switches are used to trip with a small or modest amount of weight applied. Instead of one pressure switch with a compromise design to handle hard or soft surfaces, two types of switches are used. One type is designed to trip on hard surfaces and does not come into play on soft surfaces. The other type is designed to trip on soft surfaces and does not come into play on hard surfaces. Having two switch types allows each type to be implemented easily, inexpensively and reliably since each is designed for one simple task without conflict or compromise from the other task.

To avoid preventing a new measurement and also draining the battery, a message such as "HELP" is displayed on the scale's display (e.g., an LCD display) and a beep or other audible alert sounds whenever the weighing process is complete, but a turn-On switch is still tripped. That notifies the user to remove the weight from the scale so that the scale can reset and be ready for a new measurement.

Immediately after a measurement is taken and the weighing process and display of the weight are complete, the scale performs an auto-calibration procedure. By performing an auto-calibration as part of normal operation, the expense and complexity of designing and manufacturing a scale that has a permanent calibration is avoided.

The components of the weight scale are shown in FIG. 1; they include a controller board 1, a display module 2, two pressure switches 3 for hard surfaces and one pressure switch 4 for soft surfaces, a battery 5, a case 6 with an upper load supporting surface, and in this implementations four load cells 7. A foot 8 is disposed near each corner.

During the weighing operation, the load cells 7 send a signal to the controller board 1 that contains a programmed processor or a hardware processor that interprets the weight load on the four load cells 7 and produces an output signal that is used to drive display module 2 to display the weight of the object or person on the weight scale. Generally, for high capacity personal scales, four load cells 7 are used, but any suitable array of load cells (including an array of one if suitable) supporting the upper surface of case 6 upon which an object being weighed is supported is suitable.

Figure 2:
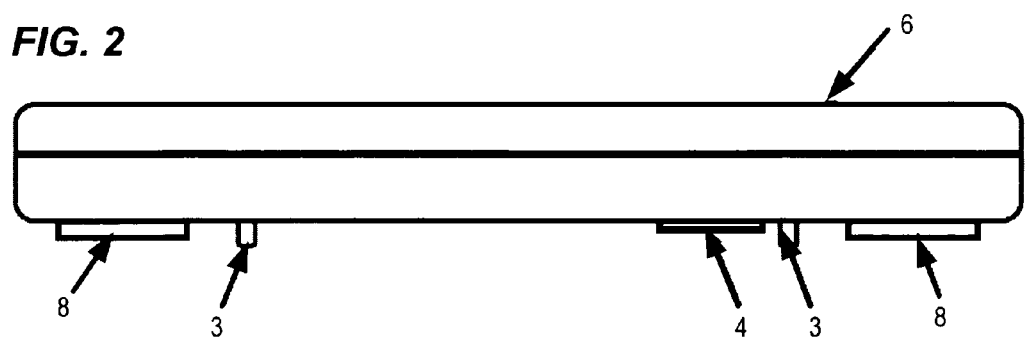
FIG. 2 is a schematic diagram of the end view of an example implementation of a weight scale such as that depicted in FIG. 1.
Figure 3:
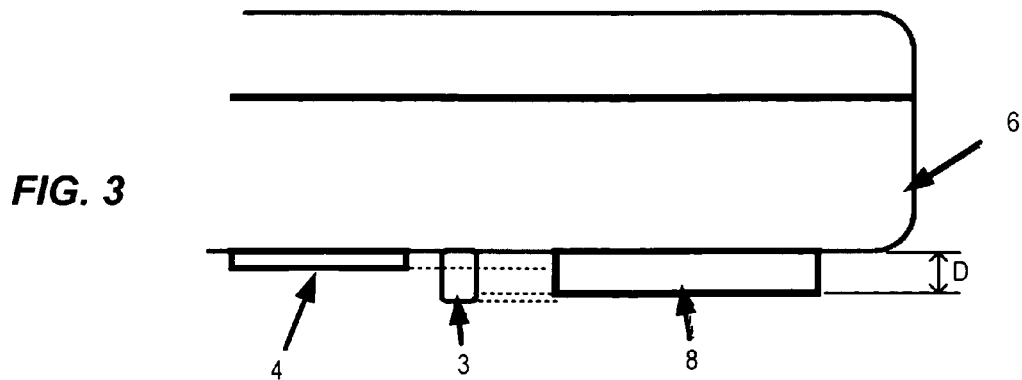
FIG. 3 is a schematic diagram of an enlarged view of the example weight scale showing greater detail of the switch positions with respect to the feet of the scale depicted in FIG. 2.

FIG. 2 shows the assembled scale in a side view and FIG. 3 shows an expanded side view of the corner of the scale. There is a cap that resides over pressure switches 3 for hard surfaces that extends farther downward than the foot 8 (which extends downward by an amount D) while the cap over pressure switch 4 for soft surfaces does not extend as far as the foot 8 as shown in the two dotted horizontal lines. The cap is preferably designed so as not to scratch or mar flooring. The weight required to trip switches 3 is greater than the weight of the scale. Thus, on a hard surface, the corners of the scale nearest switches 3 will rest on the cap of switches 3 rather than the feet 8 (in the illustrated example, the two lower feet are closest to the switches 3) which will not trip until additional weight is placed on the scale. On a hard surface, switch 4 does not have anything pressing against it and cannot trip. In one implementation, the switches 3 have a tripping force of approximately 13 pounds, and since a person tends to step one foot at a time on the scale, the switch closest to the foot will trip first turning on the weight scale. Pressure switch 4 is much more sensitive and will trip with a weight of less than a few pounds (e.g., about one pound) which is suitable for the pressure from the bottom of the scale bearing on a carpeted and padded floor.

On a soft surface such as a carpet with padding beneath it, the carpeting will press up against the bottom of the scale and on switch 4, while often switch 3 will essentially sink into the soft surface (carpet) without reliably actuating. The soft surface spreads the weight applied to the scale over the entire bottom surface of the scale rather than on the feet 8 of the scale. Thus, a weight sufficient to trip switches 3 on a hard surface may not trip it on a soft surface.

Switch 4 is much more sensitive than switches 3 and the weight spread over the entire bottom of the scale and switch 4 is sufficient to trip switch 4. Having switches 3 handle hard surfaces and switch 4 handle soft surfaces guarantees proper turn-On operation over a full range of surface types without the compromise in turn-On operation and difficulty of trying to design one switch that works well over the same range of surfaces.

Figure 4:
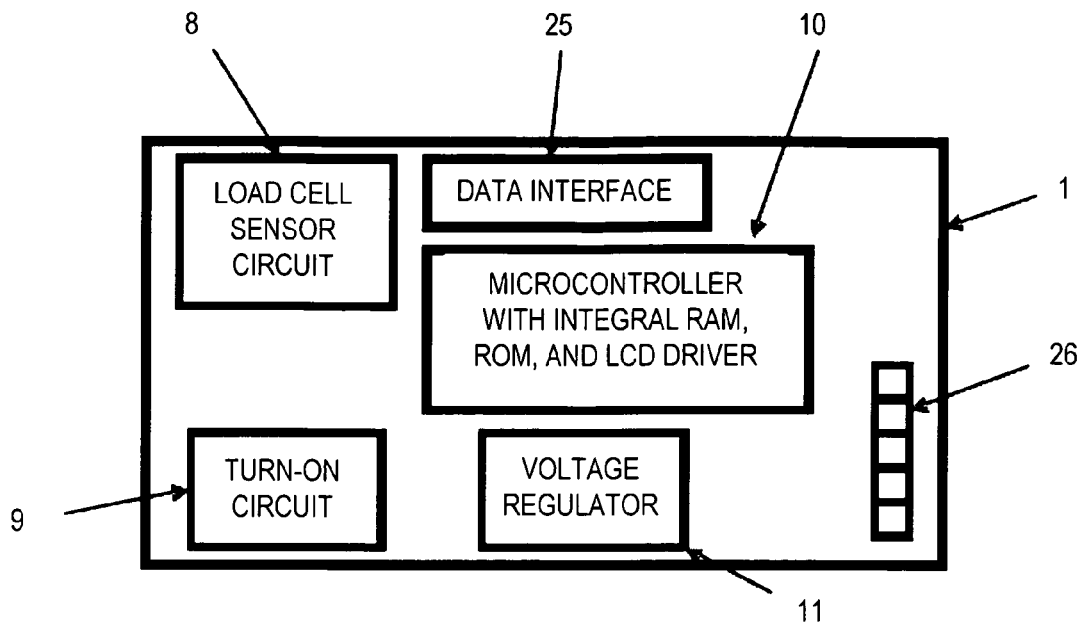
FIG. 4 is a schematic diagram of a Controller printed circuit board of the example implementation of the weight scale shown in FIG. 1.

As shown in FIG. 4, the controller board 1 includes a microcontroller 10, which contains program memory (ROM), temporary memory (RAM) and drivers for the display 7, voltage regulator circuitry 11, load cell sensor circuitry 12, and the turn-On circuitry 9. The controller board 1 also has a header into which the display module (e.g., an LCD display module) 2 plugs.

Battery 5 provides the power for all the scale electronic circuitry and for the load cells. It is wired to the voltage regulator circuitry 11 on the controller board 1. The four load cells 7 are wired to the load cell sensor circuitry 12 which provides bias current for operation and senses the level of the signal from the load cells 7. The level of the signal is proportional to the weight placed on the load cells 7. Algorithms in the microcontroller 10 convert those signals to a weight measurement. The weight measurement is displayed on the display 2.

Figure 5:
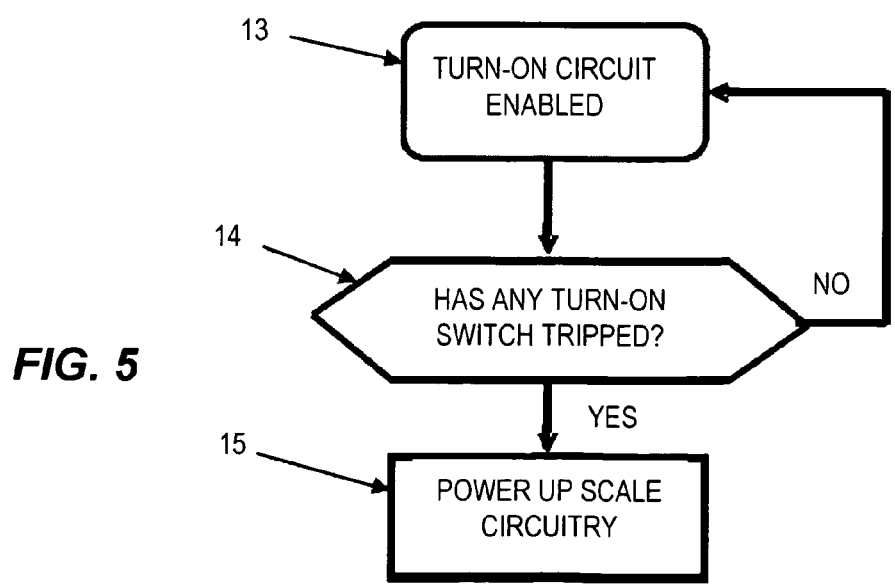
FIG. 5 is a process flow chart showing an example of a turn-On process of the weight scale in FIG. 1 as implemented in certain illustrative embodiments.
Figure 6:
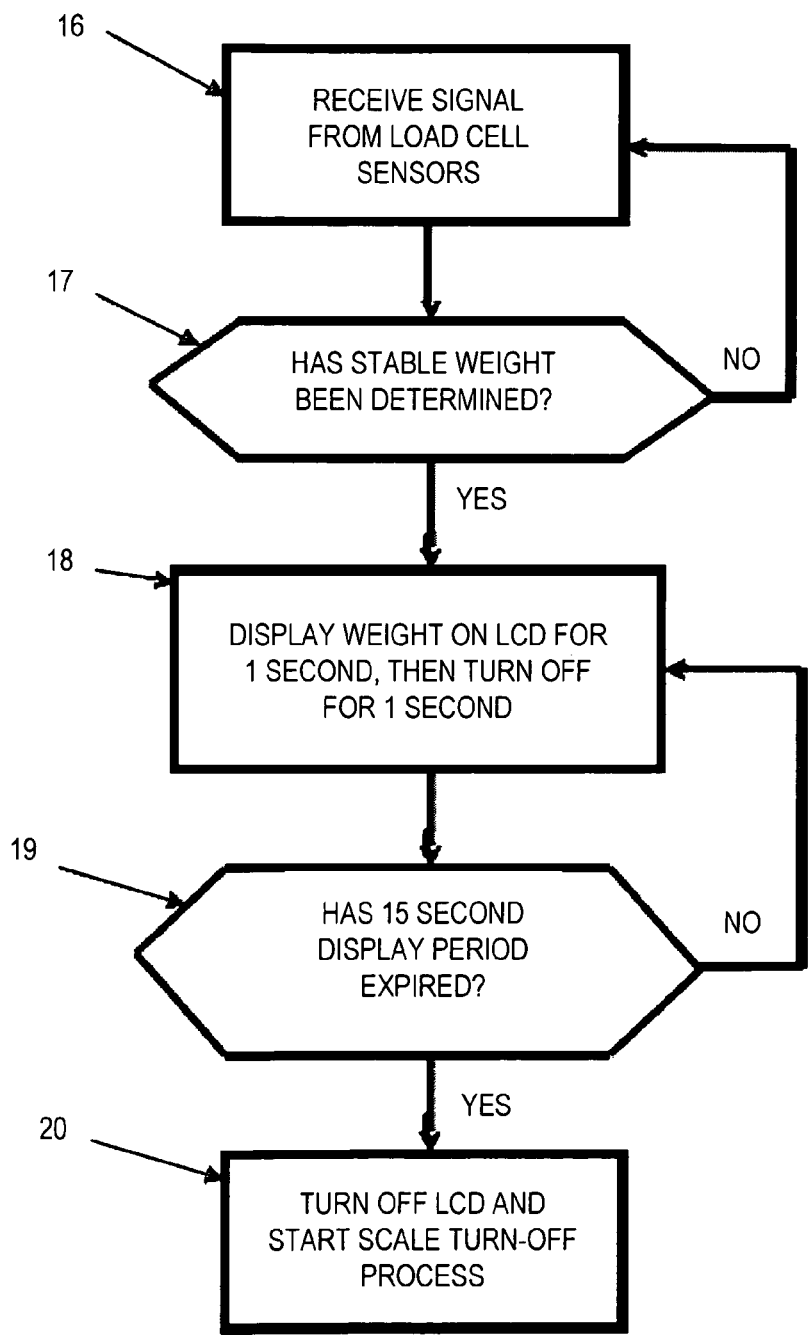
FIG. 6 is an example process flow chart showing an example weighing process for the example weight scale in FIG. 1.

A weight measurement starts with a person stepping onto the scale of FIG. 1. If the scale is on a hard surface, at least one of switches 3 will trip and if the scale is on a soft surface, switch 4 will trip when weight is applied to the scale. In either case, as shown in FIG. 5, with the Turn-On circuit enabled 13, operation 14 will sense that a switch has tripped. This causes operation 15 to apply power to all circuits in the scale, which enables the weighing operation as shown in FIG. 6.

When the user steps on the scale a voltage is generated from the load cell 7 proportional to the weight of the person. The microcontroller 10 receives the signal from the load cells as shown in operation 16. Operation 17 waits until a stable weight has been determined. Then in operation 18 that weight is displayed on the LCD for 1 second, then it blinks off then repeats the On-Off display for a nominal period of time, in this case 15 seconds as shown in operation 16. When the display period shown in operation 19 is up, operation 20 turns the display Off and initiates the Turn Off procedure.

Figure 7:
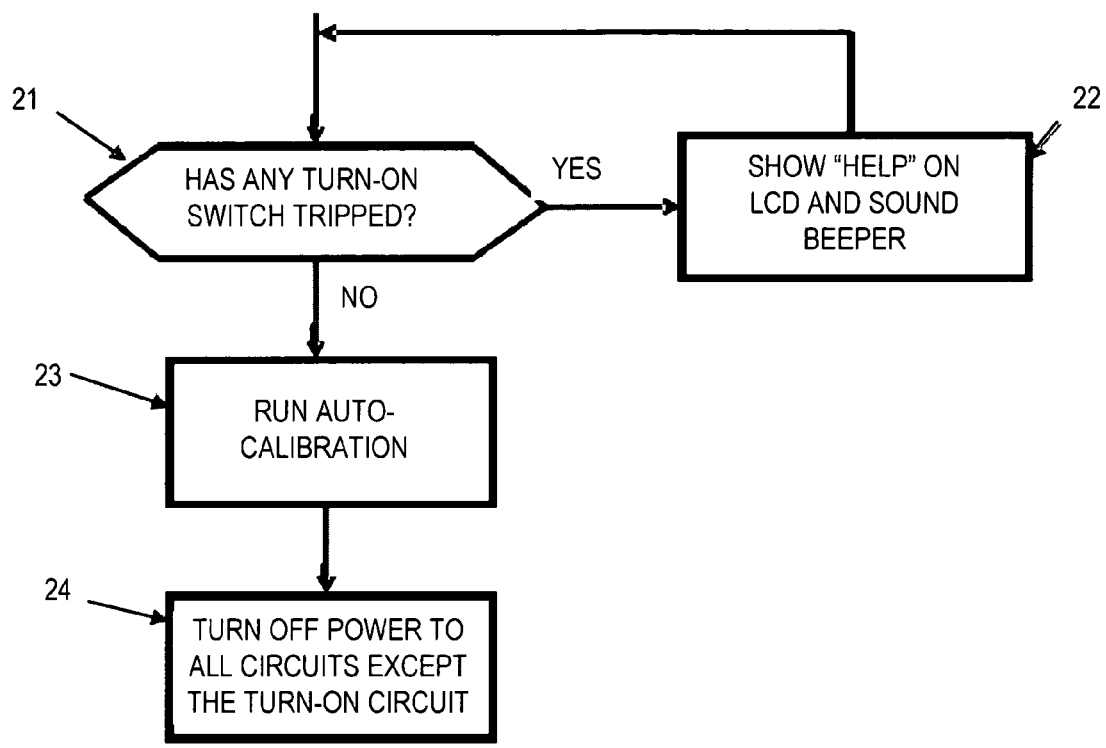
FIG. 7 is a process flow chart showing an example turn-Off process of the example weight scale depicted in FIG. 1.

The turn-Off procedure is shown in FIG. 7. Operation 21 senses if either one or more of switches 3 or switch 4 are still tripped. If they are, then operation 22 causes a beep sound from a buzzer or speaker and turns On the LCD and displays HELP. After 1 second, the LCD blinks Off, then comes back on again displaying HELP. This will continue until the weight is removed from the scale and the switch is reset. This feature helps to prevent the turn-On switches to remain tripped after a weight measurement cycle, thereby continuing to drain the battery of power. Upon seeing the HELP display and/or hearing the beep (or other audible alert), the user can pick up or move the scale to assure that there is no interference with normal operation of the switches in order to reset the scale.

Once all the switches 3 and 4 are reset, auto-calibration will be run as shown in operation 23. After the auto-calibration is complete, operation 24 turns Off power to all circuits except for the Turn-On Circuitry. The scale is now ready to take another measurement. Many variations in this procedure are possible without departing from embodiments consistent with the present invention.

The weight scale also has the capability to electronically send the weight measurements to a personal computer (PC) or other device for storage and logging into a database or patient chart. This communications can be through a cabled interface or a wireless interface. The circuitry for the cabled interface circuitry 25 is located on the Controller printed circuit board 1. The cabled interface circuitry converts the weight measurement to a data communications protocol such as RS232 asynchronous data or USB or other standard or non-standard interface and includes a connector. The user can use an appropriate cable to plug into that connector to couple the signal to a device such as a PC when the data can be stored and processed.

The weight measurement can also be optionally transmitted wirelessly. The wireless (e.g. standardized communications protocols such as Bluetooth or Zigbee or any desired proprietary protocol) circuitry can be placed on the Controller printed circuit board 1, or placed on a separate printed circuit board that plugs into a connector or header 26 on the Controller printed circuit board 1.

Thus, a weight scale consistent with certain implementations has a case having a weight supporting surface that supports an object being weighed. An array of load cells is provided upon which the weight supporting surface rests. Such load cells measure the weight supported on the weight supporting surface. A weight measuring circuit receives output signals from the array of load cells and calculates a weight responsive thereto. A first switch trips when a weight is applied to the weight supporting surface while the weight scale is situated on a soft surface. A second switch trips when a weight is applied to the weight supporting surface while the weight scale is situated on a hard surface. A power source is provided and a turn-on circuit responsive to the first and second switch applies power from the power source to the weight measuring circuit upon detection that either the first or second switch has tripped as a result of a weight being applied to the weight supporting surface.

In certain implementations, the soft surface comprises a carpeted floor with padding and the hard surface comprises a solid surface floor. In certain implementations, the second switch trips at a weight that is greater than a weight that trips the first switch. In certain implementations, the second switch activates when a weight greater than a total weight of the scale distributed across the second switch is applied to the weight supporting surface. In certain implementations, the case is supported by a set of feet extending downward from the case by a distance D, and wherein a cap on the second switch extends downward from the case by a distance greater than the distance D so as to support the case until a weight is applied to the weight supporting surface. In certain implementations, the case is supported by a set of feet extending downward from the case by a distance D, and wherein the first switch extends downward from the case by a distance less than the distance D so that the first switch is actuated when a weight is applied to the weight supporting surface causing the feet to sink into a soft surface causing the first switch to actuate by contacting the soft surface. In certain implementations, a display displays a measured weight. In certain implementations, the measured weight is displayed during a weight measurement cycle, and wherein, if the at least one of the first and second switches remains tripped at the end of the weight measurement cycle, producing an alert signal. In certain implementations, the alert signal comprises at least one of an audible alert and a visually displayed message on the display. In certain implementations, a wired or wireless interface sends weight to a PC. In certain implementations, the second switch is made up of a plurality of switches, and wherein the plurality of switches support at least a portion of the weight scale case until a weight is placed upon the weight supporting surface when the weight scale is situated on a hard surface.

In another implementation, a weight scale has a case having a weight supporting surface that supports an object being weighed. An array of load cells are provided upon which the weight supporting surface rests. A weight measuring circuit receives output signals from the array of load cells and calculates a weight responsive thereto during a weight measurement cycle. A first switch trips when a weight is applied to the weight supporting surface while the weight scale is situated on a soft surface. A second switch made up of an array of switches that trip when a weight is applied to the weight supporting surface while the weight scale is situated on a hard surface, wherein the array of switches support at least a portion of the weight scale case until a weight is placed upon the weight supporting surface when the weight scale is situated on a hard surface. The soft surface can be for example a carpeted floor with padding and the hard surface can be for example a solid surface floor, wherein the second switch trips at a weight that is greater than a weight that trips the first switch. A power source is provided and a turn-on circuit is responsive to the first and second switch to apply power from a power source to the weight measuring circuit upon detection that any of the first switch or the switches in the array comprising the second switch has tripped as a result of a weight being applied to the weight supporting surface. A display displays a measured weight, and if the at least one of the first and second switches remains tripped at the end of the weight measurement cycle, an alert message is displayed on the display.

In certain implementations, the case is supported by a set of feet extending downward from the case by a distance D, and wherein a cap on the second switch extends downward from the case by a distance greater than the distance D so as to support the case until a weight is applied to the weight supporting surface. In certain implementations, the case is supported by a set of feet extending downward from the case by a distance D, and wherein the first switch extends downward from the case by a distance less than the distance D so that the first switch is actuated when a weight is applied to the weight supporting surface causing the feet to sink into a soft surface causing the first switch to actuate by contacting the soft surface. In certain implementations, a wired or wireless interface that sends weight to a PC.

A method of turning on a weight scale having electronic weight measurement circuitry consistent with certain implementations involves receiving a signal from either one of a first switch that trips when a weight is applied to a weight supporting surface while the weight scale is situated on a soft surface, or from a second switch that trips when a weight is applied to the weight supporting surface while the weight scale is situated on a hard surface; determining that either one of the first or second switch has been tripped by application of a weight to the weight supporting surface; and upon determining that one or of the first or second switch has been tripped by application of a weight to the weight supporting surface, applying power to the weight scale's weight measurement circuitry.

In certain implementations, the soft surface comprises a carpeted floor with padding and the hard surface comprises a solid surface floor. In certain implementations, the weight scale is supported at least in part by the second switch, and wherein movement of the second switch relative to at least one of a plurality of feet supporting the weight scale trips the second switch. In certain implementations, the method further involves displaying a measured weight when the weight measurement circuitry determines a stable measurement. In certain implementations, the displaying is carried out for a specified period of time. In certain implementations, the stable measurement of weight is transferred to an external device via a wired or wireless interface.

In certain implementations, the method further involves determining that neither the first nor the second switch remains tripped; running an automatic calibration operation; and removing power from the weight scale's weight measurement circuitry. In certain implementations, the second switch comprises a plurality of switches, and wherein the plurality of switches support at least a portion of the weight scale case until a weight is placed upon the weight supporting surface when the weight scale is situated on a hard surface. In certain implementations, the measured weight is displayed during a weight measurement cycle, and wherein, if the at least one of the first and second switches remains tripped at the end of the weight measurement cycle, producing an alert signal. In certain implementations, the alert signal comprises at least one of an audible alert and a visually displayed message on the display. A tangible computer readable storage medium can store instructions which, when executed on one or more programmed processors, carry out any variant of the above described methods.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, microcontrollers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Also, while certain embodiments herein were described in conjunction with specific circuitry that carries out the functions described, other embodiments are contemplated in which the circuit functions are carried out using equivalent executed on one or more programmed processors. General purpose computers, microprocessor based computers, microcontrollers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A weight scale, comprising:
   a case having a weight supporting surface that supports an object being weighed;
   an array of load cells upon which the weight supporting surface rests;
   a weight measuring circuit that receives output signals from the array of load cells and calculates a weight responsive thereto;
   a first switch that trips when a weight is applied to the weight supporting surface while the weight scale is situated on a soft surface;
   a second switch that trips when a weight is applied to the weight supporting surface while the weight scale is situated on a hard surface;
   a power source; and
   a turn-on circuit responsive to the first and second switch to apply power from the power source to the weight measuring circuit upon detection that either the first or second switch has tripped as a result of a weight being applied to the weight supporting surface.

2. The weight scale according to claim 1, wherein the soft surface comprises a carpeted floor with padding and the hard surface comprises a solid surface floor.

3. The weight scale according to claim 1, wherein the second switch trips at a weight that is greater than a weight that trips the first switch.

4. The weight scale according to claim 1, wherein the second switch activates when a weight greater than a total weight of the scale distributed across the second switch is applied to the weight supporting surface.

5. The weight scale according to claim 1, wherein the case is supported by a set of feet extending downward from the case by a distance D, and wherein a cap on the second switch extends downward from the case by a distance greater than the distance D so as to support the case until a weight is applied to the weight supporting surface.

6. The weight scale according to claim 1, wherein the case is supported by a set of feet extending downward from the case by a distance D, and wherein the first switch extends downward from the case by a distance less than the distance D so that the first switch is actuated when a weight is applied to the weight supporting surface causing the feet to sink into a soft surface causing the first switch to actuate by contacting the soft surface.

7. The weight scale according to claim 1, further comprising a display that displays a measured weight.

8. The weight scale according to claim 7, wherein the measured weight is displayed during a weight measurement cycle, and wherein, if the at least one of the first and second switches remains tripped at the end of the weight measurement cycle, producing an alert signal.

9. The weight scale according to claim 8, wherein the alert signal comprises at least one of an audible alert and a visually displayed message on the display.

10. The weight scale according to claim 1, further comprising a wired or wireless interface that sends weight to a PC.

11. The weight scale according to claim 1, wherein the second switch comprises a plurality of switches, and wherein the plurality of switches support at least a portion of the weight scale case until a weight is placed upon the weight supporting surface when the weight scale is situated on a hard surface.

12. A weight scale, comprising:
a case having a weight supporting surface that supports an object being weighed;
an array of load cells upon which the weight supporting surface rests;
a weight measuring circuit that receives output signals from the array of load cells and calculates a weight responsive thereto during a weight measurement cycle;
a first switch that trips when a weight is applied to the weight supporting surface while the weight scale is situated on a soft surface;
a second switch comprised of an array of switches that trip when a weight is applied to the weight supporting surface while the weight scale is situated on a hard surface, and wherein the array of switches support at least a portion of the weight scale case until a weight is placed upon the weight supporting surface when the weight scale is situated on a hard surface;
wherein the soft surface comprises a carpeted floor with padding and the hard surface comprises a solid surface floor, and wherein the second switch trips at a weight that is greater than a weight that trips the first switch;
a power source;
a turn-on circuit responsive to the first and second switch to apply power from the power source to the weight measuring circuit upon detection that any of the first switch or the switches in the array comprising the second switch has tripped as a result of a weight being applied to the weight supporting surface;
a display that displays a measured weight; and
wherein, if the at least one of the first and second switches remains tripped at the end of the weight measurement cycle, an alert message is displayed on the display.

13. The weight scale according to claim 12, wherein the case is supported by a set of feet extending downward from the case by a distance D, and wherein a cap on the second switch extends downward from the case by a distance greater than the distance D so as to support the case until a weight is applied to the weight supporting surface.

14. The weight scale according to claim 12, wherein the case is supported by a set of feet extending downward from the case by a distance D, and wherein the first switch extends downward from the case by a distance less than the distance D so that the first switch is actuated when a weight is applied to the weight supporting surface causing the feet to sink into a soft surface causing the first switch to actuate by contacting the soft surface.

15. The weight scale according to claim 12, further comprising a wired or wireless interface that sends weight to a PC.

16. A method of turning on a weight scale having electronic weight measurement circuitry, comprising:
receiving a signal from either one of a first switch that trips when a weight is applied to a weight supporting surface while the weight scale is situated on a soft surface, or from a second switch that trips when a weight is applied to the weight supporting surface while the weight scale is situated on a hard surface;
determining that either one of the first or second switch has been tripped by application of a weight to the weight supporting surface; and
upon determining that one or of the first or second switch has been tripped by application of a weight to the weight supporting surface, applying power to the weight scale's weight measurement circuitry.

17. The method according to claim 16, wherein the soft surface comprises a carpeted floor with padding and the hard surface comprises a solid surface floor.

18. The method according to claim 16, wherein the weight scale is supported at least in part by the second switch, and wherein movement of the second switch relative to at least one of a plurality of feet supporting the weight scale trips the second switch.

19. The method according to claim 18, further comprising displaying a measured weight when the weight measurement circuitry determines a stable measurement.

20. The method according to claim 19, wherein the displaying is carried out for a specified period of time.

21. The method according to claim 20, further comprising transferring the stable measurement of weight to an external device via a wired or wireless interface.

22. The method according to claim 20, further comprising:
determining that neither the first nor the second switch remains tripped;
running an automatic calibration operation; and
removing power from the weight scale's weight measurement circuitry.

23. The method according to claim 16, wherein the second switch comprises a plurality of switches, and wherein the plurality of switches support at least a portion of the weight scale case until a weight is placed upon the weight supporting surface when the weight scale is situated on a hard surface.

24. The method according to claim 16, wherein the measured weight is displayed during a weight measurement cycle, and wherein, if the at least one of the first and second switches remains tripped at the end of the weight measurement cycle, producing an alert signal.

25. The method according to claim 24, wherein the alert signal comprises at least one of an audible alert and a visually displayed message on the display.

26. A tangible computer readable storage medium storing instructions which, when executed on one or more programmed processors, carry out a method according to claim 16.

* * * * *